United States Patent
Meyerzon et al.

(10) Patent No.: US 7,840,569 B2
(45) Date of Patent: Nov. 23, 2010

(54) ENTERPRISE RELEVANCY RANKING USING A NEURAL NETWORK

(75) Inventors: Dmitriy Meyerzon, Bellevue, WA (US);
Yauhen Shnitko, Redmond, WA (US);
Chris J. C. Burges, Bellevue, WA (US);
Michael James Taylor, Cambridge (GB)

(73) Assignee: Microsoft Corporation, Redmond, WA (US)

(*) Notice: Subject to any disclaimer, the term of this patent is extended or adjusted under 35 U.S.C. 154(b) by 158 days.

(21) Appl. No.: 11/874,844

(22) Filed: Oct. 18, 2007

(65) Prior Publication Data

US 2009/0106223 A1    Apr. 23, 2009

(51) Int. Cl.
*G06F 17/30* (2006.01)
(52) U.S. Cl. .............. 707/748; 707/728; 707/752; 706/62
(58) Field of Classification Search ............ 707/1–7; 706/62
See application file for complete search history.

(56) References Cited

U.S. PATENT DOCUMENTS

| | | | |
|---|---|---|---|
| 5,222,236 A | 6/1993 | Potash et al. | |
| 5,257,577 A | 11/1993 | Clark | 100/99 |
| 5,594,660 A | 1/1997 | Sung et al. | 715/203 |
| 5,606,609 A | 2/1997 | Houser et al. | 713/179 |
| 5,848,404 A | 12/1998 | Hafner et al. | 707/3 |
| 5,893,092 A | 4/1999 | Driscoll | 707/5 |
| 5,920,859 A | 7/1999 | Li | 707/5 |
| 5,933,851 A | 8/1999 | Kojima et al. | 711/133 |
| 5,960,383 A | 9/1999 | Fleischer | 704/9 |
| 5,983,216 A | 11/1999 | Kirsch et al. | 707/2 |
| 5,987,457 A | 11/1999 | Ballard | 707/5 |
| 6,006,225 A | 12/1999 | Bowman et al. | 707/5 |
| 6,012,053 A | 1/2000 | Pant et al. | 707/3 |
| 6,032,196 A | 2/2000 | Monier | 709/245 |
| 6,041,323 A | 3/2000 | Kubota | 707/5 |
| 6,070,158 A | 5/2000 | Kirsch et al. | 707/3 |
| 6,070,191 A | 5/2000 | Narendran et al. | 709/226 |
| 6,098,064 A | 8/2000 | Pirolli et al. | 707/2 |
| 6,125,361 A | 9/2000 | Chakrabarti et al. | 707/3 |
| 6,128,701 A | 10/2000 | Malcolm et al. | 711/133 |

(Continued)

FOREIGN PATENT DOCUMENTS

DE    10029644 A1    1/2002

(Continued)

OTHER PUBLICATIONS

U.S. Appl. No. 10/609,315, filed Jun. 27, 2003 entitled "Normalizing Document Metadata Using Directory Services"—Now U.S. 7,228,301 issued Jun. 5, 2007.

(Continued)

*Primary Examiner*—Debbie Le
(74) *Attorney, Agent, or Firm*—Merchant & Gould P.C.

(57) ABSTRACT

A neural network is used to process a set of ranking features in order to determine the relevancy ranking for a set of documents or other items. The neural network calculates a predicted relevancy score for each document and the documents can then be ordered by that score. Alternate embodiments apply a set of data transformations to the ranking features before they are input to the neural network. Training can be used to adapt both the neural network and certain of the data transformations to target environments.

17 Claims, 2 Drawing Sheets

U.S. PATENT DOCUMENTS

| | | | |
|---|---|---|---|
| 6,145,003 A | 11/2000 | Sanu et al. | 709/225 |
| 6,151,624 A | 11/2000 | Teare et al. | 709/217 |
| 6,167,369 A | 12/2000 | Schulze | 704/9 |
| 6,182,085 B1 | 1/2001 | Eichstaedt et al. | 707/104.1 |
| 6,182,113 B1 | 1/2001 | Narayanaswami | 709/203 |
| 6,185,558 B1 | 2/2001 | Bowman et al. | 707/5 |
| 6,202,058 B1 | 3/2001 | Rose et al. | 706/45 |
| 6,208,988 B1 | 3/2001 | Schultz | 707/5 |
| 6,216,123 B1 | 4/2001 | Robertson et al. | |
| 6,222,559 B1 | 4/2001 | Asano et al. | 345/440 |
| 6,240,407 B1 | 5/2001 | Chang et al. | 707/2 |
| 6,240,408 B1 | 5/2001 | Kaufman | 707/3 |
| 6,247,013 B1 | 6/2001 | Morimoto | 707/10 |
| 6,263,364 B1 | 7/2001 | Najork et al. | 709/217 |
| 6,285,367 B1 | 9/2001 | Abrams et al. | 715/854 |
| 6,285,999 B1 | 9/2001 | Page | 707/5 |
| 6,304,864 B1 | 10/2001 | Liddy et al. | 706/15 |
| 6,317,741 B1 | 11/2001 | Burrows | 707/5 |
| 6,327,590 B1 | 12/2001 | Chidlovski et al. | 707/6 |
| 6,349,308 B1 | 2/2002 | Whang et al. | 707/103 Z |
| 6,351,467 B1 | 2/2002 | Dillon | 370/432 |
| 6,351,755 B1 | 2/2002 | Najork et al. | 715/206 |
| 6,360,215 B1 | 3/2002 | Judd et al. | 707/3 |
| 6,385,602 B1 | 5/2002 | Tso et al. | 707/3 |
| 6,389,436 B1 | 5/2002 | Chakrabarti et al. | 715/229 |
| 6,418,433 B1 | 7/2002 | Chakrabarti et al. | 707/5 |
| 6,418,452 B1 | 7/2002 | Kraft et al. | 707/200 |
| 6,418,453 B1 | 7/2002 | Kraft et al. | 707/200 |
| 6,442,606 B1 | 8/2002 | Subbaroyan et al. | 709/224 |
| 6,473,752 B1 | 10/2002 | Fleming, III | |
| 6,484,204 B1 | 11/2002 | Rabinovich | 709/226 |
| 6,516,312 B1 | 2/2003 | Kraft et al. | 707/3 |
| 6,539,376 B1 | 3/2003 | Sundaresan et al. | 707/5 |
| 6,546,388 B1 | 4/2003 | Edlund et al. | 707/5 |
| 6,547,829 B1 | 4/2003 | Meyerzon et al. | 715/234 |
| 6,549,896 B1 | 4/2003 | Candan et al. | |
| 6,549,897 B1 | 4/2003 | Katariya et al. | 707/5 |
| 6,553,364 B1 | 4/2003 | Wu | |
| 6,594,682 B2 | 7/2003 | Peterson et al. | 718/102 |
| 6,598,047 B1 | 7/2003 | Russell et al. | 707/5 |
| 6,598,051 B1 | 7/2003 | Wiener et al. | 707/100 |
| 6,601,075 B1 | 7/2003 | Huang et al. | 707/104.1 |
| 6,622,140 B1 | 9/2003 | Kantrowitz | 707/5 |
| 6,628,304 B2 | 9/2003 | Mitchell et al. | 715/734 |
| 6,633,867 B1 | 10/2003 | Kraft et al. | 707/3 |
| 6,633,868 B1 | 10/2003 | Min et al. | 707/3 |
| 6,636,853 B1 | 10/2003 | Stephens | |
| 6,638,314 B1 | 10/2003 | Meyerzon et al. | 715/234 |
| 6,671,683 B2 | 12/2003 | Kanno | 707/5 |
| 6,701,318 B2 | 3/2004 | Fox et al. | 707/10 |
| 6,718,324 B2 | 4/2004 | Edlund et al. | 707/5 |
| 6,718,365 B1 | 4/2004 | Dutta | 709/203 |
| 6,738,764 B2 | 5/2004 | Mao et al. | 707/500 |
| 6,763,362 B2 | 7/2004 | McKeeth | 707/104.1 |
| 6,766,316 B2 | 7/2004 | Caudill et al. | 707/5 |
| 6,766,422 B2 | 7/2004 | Beyda | 711/137 |
| 6,775,659 B2 | 8/2004 | Clifton-Bligh | 707/1 |
| 6,775,664 B2 | 8/2004 | Lang et al. | 707/3 |
| 6,778,997 B2 | 8/2004 | Sundaresan et al. | |
| 6,829,606 B2 | 12/2004 | Ripley | |
| 6,859,800 B1 | 2/2005 | Roche et al. | |
| 6,862,710 B1 | 3/2005 | Marchisio | 715/206 |
| 6,868,411 B2* | 3/2005 | Shanahan | 706/52 |
| 6,871,202 B2 | 3/2005 | Broder | 707/7 |
| 6,883,135 B1 | 4/2005 | Obata et al. | 715/202 |
| 6,886,010 B2 | 4/2005 | Kostoff | 707/3 |
| 6,886,129 B1 | 4/2005 | Raghavan et al. | 715/205 |
| 6,910,029 B1 | 6/2005 | Sundaresan | 707/2 |
| 6,931,397 B1 | 8/2005 | Sundaresan | 707/5 |
| 6,934,714 B2 | 8/2005 | Meinig | 707/102 |
| 6,944,609 B2 | 9/2005 | Witbrock | 707/3 |
| 6,947,930 B2 | 9/2005 | Anick et al. | 707/5 |
| 6,959,326 B1 | 10/2005 | Day et al. | 709/217 |
| 6,973,490 B1 | 12/2005 | Robertson et al. | 709/224 |
| 6,990,628 B1 | 1/2006 | Palmer et al. | 707/501 |
| 7,016,540 B1 | 3/2006 | Gong et al. | 382/225 |
| 7,028,029 B2 | 4/2006 | Kamvar et al. | 707/5 |
| 7,039,234 B2 | 5/2006 | Geidl et al. | |
| 7,051,023 B2 | 5/2006 | Kapur et al. | 707/5 |
| 7,072,888 B1 | 7/2006 | Perkins | 707/10 |
| 7,076,483 B2 | 7/2006 | Preda et al. | 707/5 |
| 7,080,073 B1 | 7/2006 | Jiang et al. | 707/7 |
| 7,107,218 B1 | 9/2006 | Preston | 704/270 |
| 7,152,059 B2 | 12/2006 | Monteverde | 707/3 |
| 7,181,438 B1 | 2/2007 | Szabo | 707/2 |
| 7,228,301 B2 | 6/2007 | Meyerzon et al. | 707/3 |
| 7,231,399 B1* | 6/2007 | Bem et al. | 707/102 |
| 7,243,102 B1 | 7/2007 | Naam et al. | 707/7 |
| 7,246,128 B2 | 7/2007 | Jordahl | 707/100 |
| 7,257,574 B2 | 8/2007 | Parikh | |
| 7,257,577 B2 | 8/2007 | Fagin et al. | 707/7 |
| 7,260,573 B1 | 8/2007 | Jeh et al. | |
| 7,281,002 B2 | 10/2007 | Farrell | 707/3 |
| 7,308,643 B1 | 12/2007 | Zhu et al. | |
| 7,328,401 B2 | 2/2008 | Obata et al. | 715/205 |
| 7,346,604 B1 | 3/2008 | Bharat et al. | |
| 7,346,839 B2 | 3/2008 | Acharya et al. | |
| 7,356,530 B2 | 4/2008 | Kim et al. | 707/7 |
| 7,386,527 B2* | 6/2008 | Harris et al. | 706/59 |
| 7,428,530 B2 | 9/2008 | Ramarathnam et al. | 707/3 |
| 7,496,561 B2* | 2/2009 | Caudill et al. | 1/1 |
| 7,519,529 B1 | 4/2009 | Horvitz | |
| 7,599,917 B2* | 10/2009 | Meyerzon et al. | 707/3 |
| 7,685,084 B2 | 3/2010 | Sisk et al. | |
| 7,689,531 B1* | 3/2010 | Diao et al. | 706/62 |
| 7,716,225 B1 | 5/2010 | Dean et al. | |
| 2001/0042076 A1 | 11/2001 | Fukuda | 707/500 |
| 2002/0055940 A1 | 5/2002 | Elkan | 707/104.1 |
| 2002/0062323 A1 | 5/2002 | Takatori et al. | 715/206 |
| 2002/0078045 A1 | 6/2002 | Dutta | 707/7 |
| 2002/0099694 A1 | 7/2002 | Diamond et al. | 707/3 |
| 2002/0103798 A1 | 8/2002 | Abrol et al. | 707/5 |
| 2002/0107861 A1 | 8/2002 | Clendinning et al. | 707/101 |
| 2002/0107886 A1 | 8/2002 | Gentner et al. | 715/255 |
| 2002/0129014 A1 | 9/2002 | Kim et al. | 707/5 |
| 2002/0169595 A1 | 11/2002 | Agichtein et al. | 704/9 |
| 2002/0169770 A1 | 11/2002 | Kim et al. | 707/5 |
| 2003/0037074 A1 | 2/2003 | Dwork et al. | 715/229 |
| 2003/0053084 A1 | 3/2003 | Geidl et al. | |
| 2003/0055810 A1 | 3/2003 | Cragun et al. | |
| 2003/0061201 A1 | 3/2003 | Grefenstette et al. | 707/3 |
| 2003/0065706 A1 | 4/2003 | Smyth et al. | 709/200 |
| 2003/0074368 A1 | 4/2003 | Schuetze et al. | 707/103 R |
| 2003/0088545 A1 | 5/2003 | Subramaniam et al. | |
| 2003/0208482 A1 | 11/2003 | Kim et al. | 707/3 |
| 2003/0217007 A1 | 11/2003 | Fukushima et al. | |
| 2003/0217047 A1 | 11/2003 | Marchisio | 707/3 |
| 2003/0217052 A1 | 11/2003 | Rubenczyk et al. | 707/3 |
| 2004/0003028 A1 | 1/2004 | Emmett et al. | |
| 2004/0006559 A1 | 1/2004 | Gange et al. | 707/3 |
| 2004/0049766 A1 | 3/2004 | Bloch et al. | 717/121 |
| 2004/0093328 A1 | 5/2004 | Damle | 707/102 |
| 2004/0111408 A1* | 6/2004 | Caudill et al. | 707/3 |
| 2004/0117351 A1 | 6/2004 | Challapalli et al. | 707/2 |
| 2004/0148278 A1 | 7/2004 | Milo et al. | 707/3 |
| 2004/0181515 A1 | 9/2004 | Ullmann et al. | 707/3 |
| 2004/0186827 A1 | 9/2004 | Anick et al. | 707/3 |
| 2004/0194099 A1 | 9/2004 | Lamping et al. | 718/100 |
| 2004/0199497 A1 | 10/2004 | Timmons | 707/3 |
| 2004/0205497 A1 | 10/2004 | Alexander et al. | |
| 2004/0215606 A1 | 10/2004 | Cossock | 707/3 |
| 2004/0215664 A1 | 10/2004 | Hennings et al. | 707/104.1 |
| 2004/0254932 A1 | 12/2004 | Gupta et al. | 707/7 |
| 2005/0033742 A1 | 2/2005 | Kamvar et al. | 707/10 |

| | | | | |
|---|---|---|---|---|
| 2005/0044071 A1 | 2/2005 | Cho et al. ............... 707/3 | KR | 10-2006-0116042 A   11/2006 |
| 2005/0055340 A1 | 3/2005 | Dresden ............... 707/3 | | |
| 2005/0055347 A9 | 3/2005 | Cho et al. ............... 707/5 | | |
| 2005/0060186 A1 | 3/2005 | Blowers et al. | | |
| 2005/0060304 A1 | 3/2005 | Parikh | | |
| 2005/0060311 A1 | 3/2005 | Tong et al. ............... 707/1 | | |
| 2005/0071328 A1 | 3/2005 | Lawrence ............... 707/3 | | |
| 2005/0071741 A1 | 3/2005 | Acharya et al. ............. 715/208 | | |
| 2005/0086192 A1 | 4/2005 | Kodama ............... 707/1 | | |
| 2005/0086206 A1 | 4/2005 | Balasubramanian et al. ... 707/3 | | |
| 2005/0086583 A1 | 4/2005 | Obata et al. .............. 715/229 | | |
| 2005/0089215 A1 | 4/2005 | Staelin et al. | | |
| 2005/0144162 A1 | 6/2005 | Liang ............... 707/3 | | |
| 2005/0154746 A1 | 7/2005 | Liu et al. ............... 707/101 | | |
| 2005/0165781 A1 | 7/2005 | Kraft et al. ............... 707/7 | | |
| 2005/0187965 A1 | 8/2005 | Abajian ............... 707/102 | | |
| 2005/0192936 A1 | 9/2005 | Meek et al. ............... 707/3 | | |
| 2005/0192955 A1 | 9/2005 | Farrell ............... 707/5 | | |
| 2005/0210006 A1 | 9/2005 | Robertson et al. ............... 707/3 | | |
| 2005/0216533 A1 | 9/2005 | Berkhin ............... 707/204 | | |
| 2005/0240580 A1 | 10/2005 | Zamir et al. ............... 707/4 | | |
| 2005/0251499 A1 | 11/2005 | Huang ............... 707/1 | | |
| 2005/0262050 A1 | 11/2005 | Fagin et al. ............... 707/3 | | |
| 2005/0283473 A1 | 12/2005 | Rousso et al. | | |
| 2006/0036598 A1 | 2/2006 | Wu | | |
| 2006/0047649 A1 | 3/2006 | Liang ............... 707/4 | | |
| 2006/0069982 A1 | 3/2006 | Petriuc ............... 715/205 | | |
| 2006/0074871 A1 | 4/2006 | Meyerzon et al. ............... 707/3 | | |
| 2006/0074903 A1 | 4/2006 | Meyerzon et al. ............... 707/5 | | |
| 2006/0136411 A1 | 6/2006 | Meyerzon et al. ............... 707/5 | | |
| 2006/0161534 A1* | 7/2006 | Carson et al. ............... 707/3 | | |
| 2006/0173560 A1 | 8/2006 | Widrow ............... 700/48 | | |
| 2006/0195440 A1 | 8/2006 | Burges et al. ............... 707/5 | | |
| 2006/0200460 A1 | 9/2006 | Meyerzon et al. ............... 707/5 | | |
| 2006/0206460 A1 | 9/2006 | Gadkari ............... 707/3 | | |
| 2006/0206476 A1 | 9/2006 | Kapur et al. ............... 707/5 | | |
| 2006/0282306 A1 | 12/2006 | Thissen-Roe | | |
| 2006/0282455 A1 | 12/2006 | Lee et al. ............... 707/102 | | |
| 2006/0287993 A1 | 12/2006 | Yao et al. ............... 707/4 | | |
| 2006/0294100 A1* | 12/2006 | Meyerzon et al. ............... 707/7 | | |
| 2007/0038616 A1 | 2/2007 | Guha ............... 707/4 | | |
| 2007/0038622 A1 | 2/2007 | Meyerzon et al. ............... 707/5 | | |
| 2007/0073748 A1 | 3/2007 | Barney ............... 707/101 | | |
| 2007/0106659 A1 | 5/2007 | Lu et al. ............... 707/7 | | |
| 2007/0150473 A1 | 6/2007 | Li et al. ............... 707/7 | | |
| 2007/0198459 A1* | 8/2007 | Boone et al. ............... 707/1 | | |
| 2007/0276829 A1 | 11/2007 | Wang et al. | | |
| 2008/0140641 A1 | 6/2008 | Wang | | |
| 2008/0195596 A1 | 8/2008 | Sisk et al. | | |

FOREIGN PATENT DOCUMENTS

| | | | |
|---|---|---|---|
| EP | 0950961 A2 | 10/1999 | |
| EP | 0950961 A3 | 10/1999 | |
| EP | 1050830 A2 | 4/2000 | |
| EP | 1120717 A2 | 8/2001 | |
| EP | 00309121 | 7/2002 | |
| EP | 1282060 A2 | 2/2003 | |
| EP | 00309121.2-1522 | 7/2003 | |
| EP | 00309121.2-1527 | 6/2004 | |
| EP | 1557770 A1 | 7/2005 | |
| EP | 05105048 | 1/2006 | |
| EP | 05105110 | 8/2006 | |
| EP | PCT/US2006/031965 | 1/2007 | |
| EP | 00309121.2-1527 | 2/2007 | |
| JP | 10091638 | 4/1998 | |
| JP | 11328191 | 11/1999 | |
| JP | 2002-091843 | 3/2002 | |
| JP | 2003-248696 | 9/2003 | |
| KR | 10-2002-0015838 A | 3/2002 | |
| KR | 10-2003-0081209 A | 10/2003 | |

OTHER PUBLICATIONS

U.S. Appl. No. 09/493,748, filed Jan. 28, 2000 entitled "Adaptive Web Crawling Using a Statistical Model"(abandoned).

U.S. Appl. No. 11/874,579, filed Oct. 18, 2007 entitled "Ranking and Providing Search Results Based in Part on a Number of Click-Through Features".

U.S. Appl. No. 12/207,910, filed Sep. 10, 2008 entitled "Document Length as a Static Relevance Feature for Ranking Search Results".

Brin, S. et al., "The Anatomy of a Large-Scale Hypertextual Web Search Engine", Proceedings of the Seventh International World-Wide Web Conference, 'Online! Apr. 14, 1998, pp. 1-26.

Carmel, D. et al., "Searching XML Documents Via XML Fragments", SIGIR Toronto, Canada, Jul.-Aug. 2003, pp. 151-158.

Craswell, N. et al., "TREC12 Web Track as CSIRO", TREC 12, Nov. 2003, 11 pp.

Cutler, M. et al., "A New Study on Using HTML Structures to Improve Retrieval", 11th IEEE International Conference on Chicago, IL, Nov. 9-11, 1999, pp. 406-409.

Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.

Fagin, R. et al., "Searching the Workplace Web", IBM Almaden Research Center, In Proceedings of the Twelfth International World Wide Web Conference, Budapest, 2003, 21 pgs.

Hawking, D. et al., "Overview of the TREC-8 Web Track", TREC, Feb. 2000, pp. 1-18.

Hawking, D., "Overview of the TREC-9 Track", TREC, 2000, pp. 1-16.

Hawking., D. et al., "Overview of TREC-7 Very Large Collection Track", TREC, Jan. 1999, pp. 1-13.

Heery, Rachel, "Review of Metadata Formats", Program, vol. 30, No. 4, Oct. 1996, 1996 IEEE, pp. 345-373.

Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.

Jones, K. et al., "A probabilistic model of information retrieval: development and status", Department of Information Science, City University, London, Aug. 1998, 74 pgs.

Kotsakis, E., "Structured Information Retrieval in XML Documents", Proceedings of the ACM Symposium on Applied Computing, Madrid, Spain, 2002, pp. 663-667.

Kucuk, Mehmet Emin, et al., "Application of Metadata Concepts to Discovery of Internet Resources", ADVIS 2000, INCS 1909, pp. 304-313, 2000.

Lalmas, M., "Uniform Representation of Content and Structure for Structured Document Retrieval", 20th SGES International Conference on Knowledge Based Systems and Applied Artificial Intelligence, Cambridege, UK, Dec. 2000, pp. 1-12.

Larkey, Leah S., et al., "Collection Selection and Results Merging with Topically Organized U.S Patents and TREC Data", Proceedings of the Ninth International Conference on Information Knowledge Management, CIKM 2000, Nov. 6-11, 2000, pp. 282-289.

Losee, R. et al., "Research in Information Organization", Literature Review, School of Information and Library Science, Section 4, pp. 53-96, Jan. 2001.

Manning, C. et al., "CS276A Text Information Retrieval, Mining, and Exploitation: Lecture 12", Stanford University CS276A/SYMBSYS2391/LING2391 Test Information Retrieval, Mining, and Exploitation, Fall 2002, last modified Nov. 18, 2002, 8 pgs.

Nelson, Chris, "Use of Metadata Registries for Searching for Statistical Data", IEEE 2002, Dimension EDI Ltd., pp. 232-235, 2002.

Numerico, T., "Search engines organization of information and Web Topology", http://www.cafm.lsbu.ac.uk/eminars/sse/numerico-6-dec-2004.pdf, Dec. 6, 2004, 32 pgs.

Ogilvie, P. et al., "Combining Document Representations for Known-Item Search", Proceedings of the 26th Annual International ACM SIGIR Conference on Research and Development in Information Retrieval, Toronto, Canada, 2003, pp. 143-150.

Robertson, S. et al., "Okapi at TREC-4", 1996, 24 pp.

Robertson, S. et al., "Some Simple Effective Approximations to the 2-Poisson Model for Probabilistic Weighted Retrieval", Proceedings of the 17th Annual International ACM SIGIR Conference on Research and Development in Information Retrieval, 1994, pp. 232-241.

Schulz, Stefan, et al., "Indexing Medical WWW Documents by Morphemes", MEDINFO 2001 Proceedings of the 10th World Congress on Medical Informatics, Park I, IOS Press, Inc., pp. 266-270, 2001.

Singhal, A. et al., "AT&T at TREC-9", Proceedings of the Ninth Text Retrieval Conference, NIST Special Publication 500-249, 'Online! 2001, pp. 103-105.

Sturdy, Derek, "Squirrels and nuts: metadata and knowledge management", Business Information Review, 18(4), pp. 34-42, Dec. 2001.

Voorhees, E., "Overview of TREC 2002", Gaithersburg, Maryland, Nov. 19-22, 15 pp.

Web Page "Reuters: Reuters Corpus", http://about.reuter.com/researchandstandards/corpus/, viewed Mar. 18, 2004.

Westerveld, T. et al., "Retrieving Web pages using Content, Links, URLs and Anchors", Proceedings of the Tenth Text Retrieval Conference, NIST Special Publication, 'Online! Oct. 2001, pp. 1-10.

Wilkinson, R., "Effective Retrieval of Structured Documents", Annual ACM Conference on Research and Development, 1994, 7 pp.

Yi, Jeonghe,e et al., "Metadata Based Web Mining for Topic-Specific Information Gathering", IEEE, pp. 359-368, 2000.

Yi, Jeonghee, et al., "Using Metadata to Enhance Web Information Gathering", D.Suciu and G. Vossen (eds.): WebDB 2000, LNCS 1997, pp. 38-57, 2001.

Zamir, O. et al., "Grouper: A Dynamic Clustering Interface to Web Search Results", Computer Networks (Amsterdam, Netherlands: 1999), 31(11): 1361-1374, 1999.

"Microsoft SharePoint Portal Server 2001 Resource Kit: Chapter 24, Analyzing the Default Query for the Dashboard", http://www.microsoft.com/technet/prodtechnol/sppt/sharepoint/reskit/part5/c24spprk.mspx, printed on May 22, 2006, 5 pp.

"Microsoft Full-Text Search Technologies", http://www.microsoft.com/technet/prodtechnol/sppt/sharepoint/evaluate/featfunc/ms-searc..., published on Jun. 1, 2001, printed on May 22, 2006, 13 pp.

"Microsoft Managing External Content in Microsoft Office SharePoint Portal Server 2003", http://www.microsoft.com/technet/prodtechnol/sppt/reskit/c2261881x.mspx, published on Jun. 9, 2004, printed on May 22, 2006, 20 pp.

"Planning Your Information Structure Using Microsoft Office SharePoint Portal Server 2003", http://www.microsoft.com/technet/prodtechnol/sppt/reskit/c0861881x.mspx, published on Jun. 9, 2004, printed on May 22, 2006, 22 pp.

Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.

"SharePoint Portal Server 2001 Planning and Installation Guide", http://www.microsoft.com/technet/prodtechnol/sppt/sharepoint/plan/planinst.mspx, printed on May 22, 2006, 86 pp.

Najork, Marc et al., "Breadth-First Crawling Yields High-Quality Pages", ACM, Compaq Systems Research Center, Hong Kong, 2001, pp. 114-118.

Cho et al., "Efficient Crawling Through URL Ordering", In Proceedings of the 7th International World Wide Web Conference, Apr. 1998, pp. 161-180.

Chakrabarti, S., "Recent Results in Automatic Web Resource Discovery", ACM Computing Surveys, vol. 31, No. 4es, Dec. 1999, pp. 1-7.

Lam et al., "Automatic Document Classification Based on Probabilistic Reasoning: Model and Performance Analysis", IEEE, 1997, pp. 2719-2723.

Lee, J.K.W. et al., "Intelligent Agents for Matching Information Providers and Consumers on the World-Wide Web", IEEE, 1997, pp. 189-199.

Huang et al., "Design and Implementation of a Chinese Full-Text Retrieval System Based on Probabilistic Model", IEEE, 1993, pp. 1090-1093.

U.S. Official Action in U.S. Appl. No. 11/073,381 mailed Jul. 10, 2008.

U.S. Official Action in U.S. Appl. No. 11/206,286 mailed Jul. 14, 2008.

U.S. Official Action in U.S. Appl. No. 11/238,906 mailed Sep. 16, 2008.

U.S. Official Action in U.S. Appl. No. 11/019,091 mailed Dec. 11, 2008.

U.S. Official Action in U.S. Appl. No. 11/073,381 mailed Apr. 15, 2009.

U.S. Official Action in U.S. Appl. No. 11/238,906 mailed May 19, 2009.

U.S. Official Action in U.S. Appl. No. 10/955,983 mailed Jun. 10, 2009.

Chen, Hsinchun et al., "A Smart Itsy Bitsy Spider for the Web", Journal of the American Society for Information Science, 49(7), 1998, pp. 604-618.

Kleinberg, Jon M., "Authoritative Sources in a Hyperlinked Environment", Proceedings of the ACM-SIAM symposium on Discrete Algorithms, 1998, 34 pp.

http://delivery.acm. org/10.1145/1090000/1081899/p239-radlinski.pdf?key1=1081899&key2=3628533811&coll=GUIDE&CFID=27212902&CFTOKEN=53118399, "Query Chains: Learning to Rank from Implicit Feedback," Filip Radlinsky, et al., 10 pages, KDD'05, Chicago, IL, Aug. 21-24, 2005.

http://people.cs.uchicago.edu/~matveeva/RankerSIGIR06.pdf, "High Accuracy Retrieval with Multiple Nested Ranker," Irina Matveeva, et al., 8 pages, SIGIR'06, Seattle, WA Aug. 6-11, 2006.

http://people.cs.vt.edu/~xwensi/Publication/p118-xue.pdf, "Optimizing Web Search Using Web Click-Through Data," Gui-Rong Xue, et al., 9 pages, CIKM'04, Nov. 8-13, 2004.

U.S. Final Office Action issued in U.S. Appl. No. 11/238,906 mailed Dec. 18, 2009.

U.S. Final Office Action issued in U.S. Appl. No. 11/412,723 mailed Mar. 11, 2010.

Japanese Final Rejection in Application No. 2008-527094 mailed Jan. 22, 2010, 17 pages.

Egyptian Official Action in PCT 269/2008 mailed Feb. 1, 2010, 2 pages.

Agichten et al., "Improving Web Search Ranking by Incorporating User Behaviior Information"—http://www.mathes.emory.edu/~eugene/papers/sigir2006ranking.pdf, ACM 2006.

Taylor et al., "Optimisation Methods for Ranking Functions with Multiple Parameters"—http://delivery.acm.org/10.1145/1190000/1183698/p585-taylor.pdf?key1=1183698&key2=3677533811&coll=GUIDE&dl=GUIDE&CFID=22810237&CFTOKEN=34449120, ACM 2006.

Chinese First Official Action mailed Jun. 19, 2009 in Application No. 200680029645.1.

Chinese First Official Action mailed Jun. 19, 2009 in Application No. 200680035828.4.

Chinese Third Official Action mailed Sep. 4, 2009 in Application No. 200510088213.5.

Japanese Notice of Rejection mailed Sep. 11, 2009 in Application No. 2008-527094.

U.S. Official Action in U.S. Application No. 11/019,091 mailed Sep. 1, 2009.

U.S. Official Action in U.S. Application No. 11/412,723 mailed Sep. 3, 2009.

U.S. Official Action in U.S. Application No. 11/073,381 mailed Sep. 29, 2009.

Chen, Michael et al., Cha Cha, "A System for Organizing Intranet Search Results," Computer Science Department, University of California, Berkeley, 1999, pp. 1-12.

Fagin, Ronald, "Searching the Workplace Web," Mar. 3, 2005, pp. 1-10.

Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.

Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.

Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.

MSDN, "Understanding Ranking," http://msdn.microsoft.com/en-us/library/ms142524.aspx, Sep. 2007, 4 pages.

Senecal, Sylvain, "Consumers' Decision-Making Process and Their Online Shopping Behavior: A Clickstream Analysis," Jun. 1, 2004, pp. 1600-1607.

Shamsfard, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.

Smyth, Barry, "Relevance at a Distance—An Investigation of Distance-Biased Personalization on the Mobile Internet," no date, pp. 1-6.

Wen, Ji-Rong, "Query Clustering Using User Logs," Jan. 2002, pp. 59-81.

Yuwono, Budi and Lee, Dik L., "Search and Ranking Algorithms for Locating Resources on the World Wide Web", IEEE, 1996, pp. 164-170.

U.S. Official Action mailed Dec. 15, 2005 in U.S. Appl. No. 10/609,315.

U.S. Official Action mailed Apr. 5, 2006 in U.S. Appl. No. 10/981,962.

U.S. Official Action mailed Jun. 1, 2006 in U.S. Appl. No. 10/609,315.

U.S. Official Action mailed Sep. 21, 2006 in U.S. Appl. No. 10/981,962.

U.S. Official Action mailed Oct. 16, 2006 in U.S. Appl. No. 10/804,326.

U.S. Official Action mailed Nov. 3, 2006 in U.S. Appl. No. 10/955,462.

U.S. Official Action mailed Mar. 22, 2007 in U.S. Appl. No. 10/955,983.

U.S. Official Action mailed Apr. 30, 2007 in U.S. Appl. No. 10/981,962.

U.S. Official Action mailed May 11, 2007 in U.S. Appl. No. 10/955,462.

U.S. Official Action mailed Jun. 7, 2007 in U.S. Appl. No. 10/804,326.

U.S. Official Action mailed Jun. 20, 2007 in U.S. Appl. No. 11/019,091.

U.S. Official Action mailed Sep. 10, 2007 in U.S. Appl. No. 10/955,462.

U.S. Official Action mailed Sep. 18, 2007 in U.S. Appl. No. 11/073,381.

U.S. Official Action mailed Nov. 13, 2007 in U.S. Appl. No. 10/955,983.

U.S. Official Action mailed Dec. 11, 2007 in U.S. Appl. No. 10/804,326.

U.S. Official Action mailed Jan. 8, 2008 in U.S. Appl. No. 11/238,906.

U.S. Official Action mailed Mar. 17, 2008 in U.S. Appl. No. 10/981,962.

U.S. Official Action mailed Apr. 3, 2008 in U.S. Appl. No. 11/019,091.

U.S. Official Action mailed May 28, 2008 in U.S. Appl. No. 11/412,723.

U.S. Official Action mailed Jul. 21, 2008 in U.S. Appl. No. 10/955,983.

U.S. Official Action mailed Dec. 10, 2008 in U.S. Appl. No. 10/804,326.

U.S. Official Action mailed Dec. 18, 2008 in U.S. Appl. No. 10/955,983.

U.S. Official Action mailed Dec. 24, 2008 in U.S. Appl. No. 11/206,286.

U.S. Official Action mailed Mar. 6, 2009 in U.S. Appl. No. 11/412,723.

EP Exam Report in EP 05105048.2-2201 mailed Apr. 23, 2007.

Chinese First Official Action in 200510088527.5 mailed Apr. 18, 2008.

Chinese First Official Action in 200510088213.5 mailed May 9, 2008.

Chinese Second Official Action in 200510088213.5 mailed Oct. 10, 2008.

Chinese Second Official Action in 200510088527.5 mailed Dec. 26, 2008.

PCT Search Report in PCT/US2008/011894 mailed Feb. 27, 2009.

Chinese Decision on Rejection in 200510088213.5 mailed Mar. 6, 2009.

U.S. Office Action issued in U.S. Appl. No. 11/073,381 mailed Apr. 12, 2010, 25 pages.

Chinese Second Office Action in application No. 200680029645.1 mailed Apr. 6, 2010, 12 pages.

Agarwal et al., "Ranking Database Queries Using User Feedback: A Neural Network Approach", Fall 2006, 9 pp.

U.S. Official Action in U.S. Appl. No. 11/874,579 mailed Jun. 22, 2010, 23 pages.

European Official Action in Application No. 05105110.0-1527 mailed Aug. 4, 2010, 6 pages.

U.S. Office Action issued in U.S. Appl. No. 11/073,381 mailed Apr. 12, 2010, 25 pages.

\* cited by examiner

ENTERPRISE RELEVANCY RANKING USING A NEURAL NETWORK

CROSS-REFERENCE TO RELATED APPLICATIONS.

This application related to co-pending application Ser. No. 11/874,579 filed on the same day herewith, and titled "Ranking and Providing Search Results" which is owned by the same assignee of this application.

BACKGROUND

The use of search engines to locate relevant documents within a database, enterprise intranet, or the Internet has become commonplace. At a very high level, most search engines function by performing three distinct steps: identifying all documents which match the search criteria (the "candidate documents"); ranking the candidate documents based on a predicted relevance; and presenting the results to the user beginning with the most relevant.

The quality of the relevance ranking function is very important to the user's satisfaction with the search engine because the user is not expected to, and in many cases cannot realistically, review the entire set of matching documents. In most cases, the user will only review a relatively small number of those documents and so must be presented the most relevant candidates within that small subset for the search to be successful.

For purposes of comparing the performance of different ranking functions, it is convenient to approximate the overall user satisfaction by a single metric or set of metrics. Typically, the metric is computed over a representative set of queries that are selected by random sampling from the search domain. The metric can be as simple as the average count of relevant documents in the top N (1,5 or 10) results, often referred to as Precision @1, 5, or 10, or a slightly more complicated measure such as Normalized Discounted Cumulative Gain (NDCG).

The quality of the ranking function is dependent primarily on two characteristics: the set of features on which the ranking is based, and the specific algorithm applied to the features. The ranking features are attributes of the candidate documents that contribute to identifying relevance of the document. The ranking algorithm determines how these features are combined together into a single number that can be used to rank order the documents. Typical search engines use an algorithm which relies upon a linear combination of the ranking features. Neural networks have also been applied in the area of Internet searching.

The preferred set of ranking features varies depending on the search domain. Much of the emphasis for search engine development is on Internet searches. However, enterprise s searching of an intranet or document library is also in high demand but requires a different, tailored set of features for optimal results. This is driven primarily by different characteristics of the domain and the documents themselves.

SUMMARY

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

Various aspects of the subject matter disclosed herein are related to utilizing a neural network to determine relevancy scores derived from a set of ranking features which have been found to perform well in an enterprise environment.

Other aspects relate to applying a set of transformations to the ranking features prior to input to the neural network. Some of these transformations use constant values which can be configured to tailor the invention to specific environments. If desired, this configuration can be incorporated into the process of training the neural network itself.

The approach describe below has demonstrated improved user satisfaction metrics of approximately 10% for Precision @ 10 and approximately a 4.5 point increase in NDCG, and may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the above summary can be obtained by reference to the accompanying drawings, which are briefly summarized below, to the following detailed description of present embodiments, and to the appended claims.

DETAILED DESCRIPTION

This detailed description is made with reference to the accompanying drawings, which form a part hereof, and which show, by way of illustration, specific exemplary embodiments. These embodiments are described in sufficient detail to enable those skilled in the art to practice what is taught below, and it is to be understood that other embodiments may be utilized and that logical, mechanical, electrical, and other changes may be made without departing from the spirit or scope of the subject matter. The following detailed description is, therefore, not to be taken in a limiting sense, and its scope is defined only by the appended claims.

Overview

At a very high level of abstraction, a search engine which is used by a user to locate documents follows a process consisting of three steps: searching for candidate documents; ranking the candidate documents; and displaying the ranked documents to the user.

Searching typically involves obtaining a set of keywords from the user to direct the search and then identifying all documents within the search domain which match those keywords. In attempting to match the keywords, the search engine may compare the keywords to a variety of document attributes (i.e., title, body, etc), document metadata, or metadata about the candidate document maintained in another document (i.e., anchor text on hyperlinks to the candidate).

The resulting set of candidate documents contains all documents from the search domain which may be relevant. Clearly, some are more likely to be relevant than others.

Ranking the candidate documents attempts to predict the relevance of the documents to the user. This is done by applying a ranking function to one or more characteristics, or ranking features, of the candidate documents to obtain a score for each document. The candidate documents are then ordered by their score in decreasing order of predicted relevance.

Following ranking, the ordered candidate documents are then presented to the user starting with the most relevant. Typically, the list is presented in relatively small groups, such as 10 or 20 at a time. Because of a natural tendency for the user to only review a small number of these groups, it is important that the user find what they consider to be the most relevant documents within this small subset of the candidate documents. User satisfaction with the search engine is thus critically dependent upon the predicted relevance calculated by the ranking function matching the user's perceived relevance so that the user finds what they want as easily as possible. It is the step of ranking the candidate documents which is the focus of the description below and will be discussed now in more detail.

Implementation of the Ranking Function in a Neural Network

The use of neural networks is known in the art. As such, their general principles will not be discussed in detail herein. Only a brief overview will be provided to establish a context for the present subject matter.

It is feasible to implement neural networks either in hardware or software and these embodiments would generally be considered equivalent. As is typical, hardware generally provides increased speed while software provides greater flexibility. The embodiments described herein will be presented as software implementations with the understanding that they encompass an equivalent hardware, or mixed hardware/software solution.

The subject matter may be described in the general context of computer-executable instructions, such as program modules, executed in an appropriate operating environment by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 1:
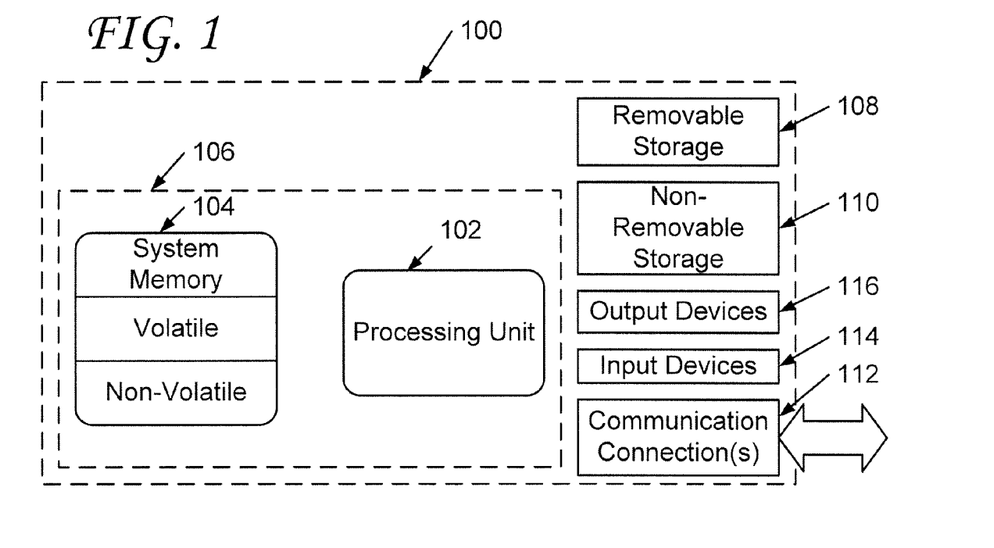
FIG. 1 is a block diagram illustrating an exemplary operating environment in which relevancy ranking using a neural network may be implemented.

FIG. 1 illustrates one example of a suitable operating environment 100 in which a software embodiment may be implemented. This is only one example of a suitable operating environment and is not intended to suggest any limitation as to the scope of use or functionality. Other well known computing systems, environments, and/or configurations that may be suitable for use include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

In its most basic configuration, operating environment 100 typically includes at least one processing unit 102 and memory 104. Depending on the exact configuration and type of computing device, memory 104 may be volatile (such as RAM), non-volatile (such as ROM, flash memory, etc.), or some combination of the two. This most basic configuration is illustrated in FIG. 1 by dashed line 106. Further, environment 100 may also include storage devices (removable, 108, and/or non-removable, 110) including, but not limited to, magnetic or optical disks or tape. Similarly, environment 100 may also have input device(s) 114 such as keyboard, mouse, pen, voice input, etc. and/or output device(s) 116 such as a display, speakers, printer, etc. Also included in the environment may be one or more communication connections, 112, such as LAN, WAN, point to point, etc. All of these devices are well known in the art and need not be discussed at length here.

Operating environment 100 typically includes at least some form of computer readable media. Computer readable media can be any available media that can be accessed by processing unit 102 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 100 may be a single computer operating in a networked environment using logical connections to one or more remote computers. The remote computer may be a personal computer, a server, a router, a network PC, a peer device or other common network node, and typically includes many or all of the elements described above. The logical connections may include any method supported by available communications media. Such networking environments are commonplace in offices, enterprise-wide computer networks, intranets and the Internet.

Figure 2:
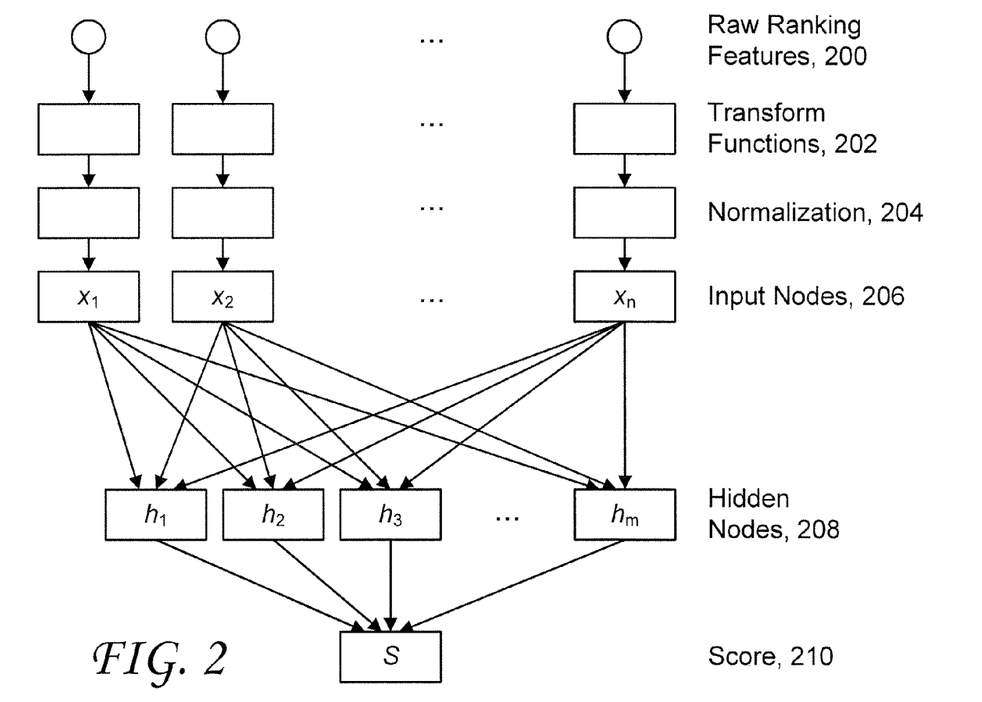
FIG. 2 is a block diagram of an exemplary topology for a neural network and supporting input nodes.
Figure 3:
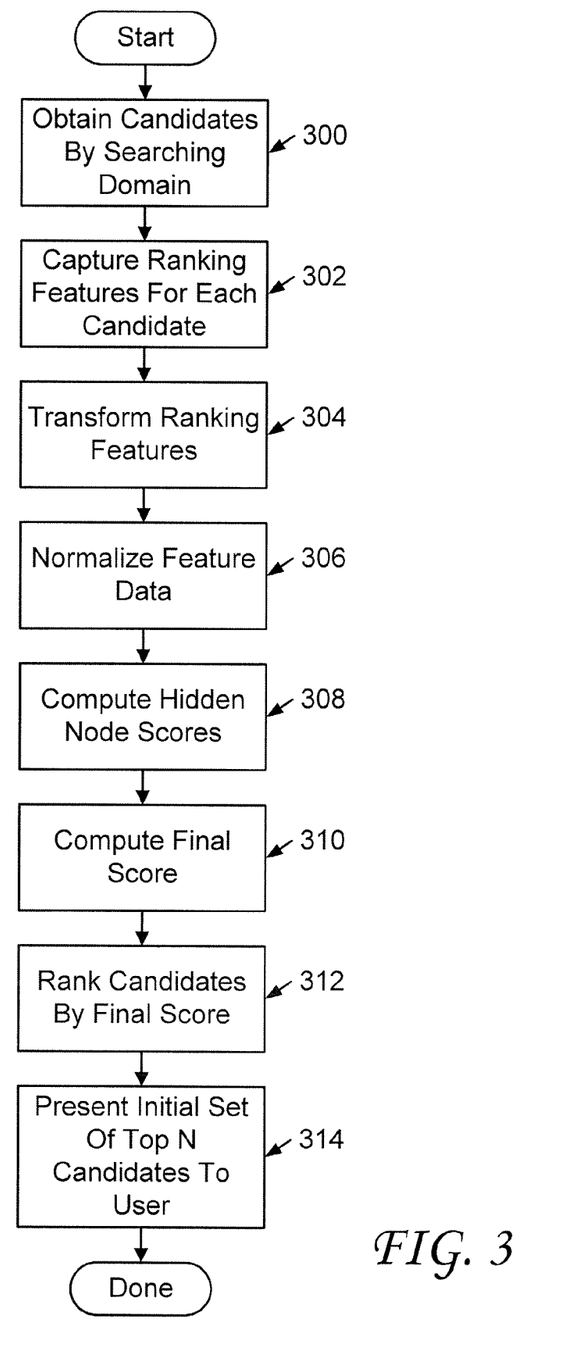
FIG. 3 is a flow diagram which provides an overview of the processing steps used in an embodiment.

Referring to FIG. 2, the topology of an exemplary neural network configured to implement a ranking function is presented. In addition, an exemplary set of processing applied to the inputs are identified. The input processing includes the transform function, 202, and normalization, 204, layers. The neural network itself comprises the input nodes, 206, hidden nodes, 298, and score, 210, layers. It should be noted that the number of nodes at any layer may be modified as appropriate. FIG. 3 provides an accompanying overview of the general process implemented including the steps embodied in the architecture of FIG. 2.

At the top layer, 200, the raw data values for the ranking features are made available. These may be any of a variety of data types including numeric values, Boolean flags, character codes, labels etc., and result from steps 300 and 302 in FIG. 3. These are the relevancy ranking features. The transform functions, 202, convert the raw data values into a form more suitable for the neural network, step 304. In some cases this will convert linear data to non-linear. In others it adjusts the shape of a curve. Any appropriate transformation may be used and it is not required that all inputs be transformed. Where the data is already in an appropriate form the transformation step may be bypassed. One example of such data is the BM25 ranking feature discussed below.

One exemplary transformation is that for Click Distance (CD). CD is a query-independent ranking feature that measures the number of "clicks" required to reach a given page, or document, from a reference location. It takes advantage of the hierarchical structure of an intranet which usually follows a tree structure, with a root node (often the homepage) and subsequent branches extending to other nodes from that root. Viewing the tree as a graph, the CD is the shortest path between the root, as reference location, and the given page.

In its raw form, CD increases linearly in value the further the candidate document is from the root. Typically, the greater the CD, the less relevant the document is likely to be. Therefore, the formula $$\frac{1}{1+kx}$$

is used, where x is the raw value for CD, and k is the saturation constant. This gives a value that decreases with distance rather than increasing. It has the further advantage that the value for k can be modified separately or as part of the neural network training to adjust the rate of decrease providing an additional degree of control over sensitivity to this feature.

Another exemplary transformation is that for URL Depth (UD). Simplistically, UD counts the number of slashes ("/") in the Uniform Resource Locator (URL) of a network resident document. More accurately, it is how many levels deep into the storage structure (i.e., file system) the document is stored relative to a defined root level. Like CD, UD increases with depth while presumed relevance is decreasing. The same formula $$\frac{1}{1+kx}$$

is used to transform UD, but with x representing the raw value for UD and k being a distinct saturation value which is also trainable.

A further exemplary transformation is that applied to enumerated data types. One example of such a data type is file type and another is language. For any given search domain, there are a finite set of file types present and/or supported by the search engine. For example an enterprise intranet may contain word processing documents, spreadsheets, HTML web pages, and other documents. Each of these file types may have a different impact on the relevance of the associated document. An exemplary transformation will convert the single file type value into a set of binary flags, one for each supported file type. Each of these flags is then made available to the neural network individually so that each may be given a separate weight and processed separately. Language (in which the document is written) can be handled in a similar manner, with a single discrete binary flag used to indicate whether or not the document is written in the user's primary language.

After any required transformations are applied, the data is preferably normalized in layer 204, step 306. This technique assures that all input data has the same average value and distribution. In an exemplary embodiment, the data is normalized so that it has an expected value of 0 and a standard deviation of 1. The normalized data is then provided to the neural network input nodes, 206. These nodes do not modify the data in any manner, but serve to distribute the data to each of the hidden nodes, layer 208, as illustrated.

The next step is to process the ranking features in the neural network, beginning with the calculation of the hidden node scores, step 308. In an exemplary embodiment, each of the hidden nodes, $h_j$, calculates a linear combination of the input values using the formula $$h_j = \tanh\left(\left(\sum_{i=1}^{n} x_i \cdot w_{ij}\right) + t_j\right)$$

where $h_j$ is the output of hidden node j; $x_i$ is the input value from input node i; $w_{ij}$ is the weight to be applied to input value $x_i$ by hidden node j; and $t_j$ is the threshold value for hidden node j, and tan h( ) is the hyperbolic tangent function. Alternatively, other sigmoid functions can be used in place of tan h( ).

The overall relevance ranking score is calculated, step 310, by the single node S in the scoring layer, 210, of the neural network. An exemplary embodiment uses the formula $$\text{Score}(x_1, \ldots, x_n) = \left(\sum_{j=1}^{m} h_j \cdot w2_j\right)$$

Where $h_j$ is the output of hidden node j as calculated above and $w2_j$ is the weight to be applied to hidden node output j.

An advantage of the above approach is that the final score provides a non-linear combination of the inputs (ranking features). This overcomes a disadvantage of the linear combinations which assume independence of the input variables. A clear counter example is CD and UD (defined above). These will not typically be totally independent because it is probable that as UD increases (the document is located deeper in the tree) CD will also increase as more clicks are needed to navigate the tree. Dependencies such as these can be captured using a neural network implementation of the relevance ranking function.

With the scoring process complete, the candidate documents will be rank ordered according to their relevancy score, step 312, and displayed to the user, step 314. Note that step 312 is not essential to the scoring of the documents but performs actual ranking ordering of the documents based on the scoring results. Similarly, step 314 is not part of the ranking process but is a typical application of the results in the context of a search engine.

Relevance Ranking in an Enterprise Environment

One embodiment focuses on searching for documents within an enterprise environment. That is, items located on a company intranet, internal database or similar. In this environment the documents, and the search domain itself, have characteristics which differ sufficiently from the Internet that different relevancy ranking features are needed to achieve optimal results.

One such characteristic is that the documents are far more likely to be maintained by a custodian or at least according to a standard process than is the case of the public access Internet. Because of this, documents are more likely to have associated metadata and that metadata is more likely to be accurate. This characteristic increases the utility of metadata in determining the predicted relevance of documents.

Another distinguishing characteristic is that enterprise document collections tend to be more hierarchically organized than the Internet. This is likely due to these collections being focused on the business of the enterprise in question and tending to be narrower, and deeper, than a broad, general interest collection. It is also more likely that the collection is indexed and cross referenced via hyperlinks since it is being actively maintained.

Because of the more hierarchical nature of enterprise search domains, features such as CD and UD, as defined above, become more viable predictors of relevancy. Where a collection is being actively maintained, the most relevant and authoritative documents will be the most accessible. This implies a short CD and shallow UD. The further a document is from the authoritative references, the less relevant it is likely to be. This argument is even stronger where CD is improved by using a Biased Click Distance. Briefly, Biased Click Distance provides for the CD of documents which have been identified as authoritative to be manually specified as arbitrarily low, thus improving their relevancy score, and the scores for other documents are then calculated based on their distance from these documents, rather than only from the root node.

Another ranking feature which is useful in the enterprise environment is file type. While the Internet will almost certainly contain a wider variety of file types as a raw measure, it is far more uniform as a relative measure. Because of its nature, the Internet can be expected to be dominated by web-related document types (HTML, ASP, etc.). This uniformity limits the value of file type as a relevancy predictor. On the other hand, an enterprise domain is more likely to contain a relatively high percentage of content documents and they are more likely to be retained in their native format. That is, word processing documents will remain as such, rather than being converted to HTML; a CAD file will be available in its original form, rather than being converted to a JPG image; etc. Because of this, file type will serve as an accurate predictor of document relevancy for certain types of information.

Metadata may also be a useful ranking feature in the enterprise environment. As discussed above, metadata is more likely to be complete and accurate in an enterprise. Keywords stored with the document are more likely to be drawn from the vocabulary of the enterprise business. Titles will likely be more meaningful, since they will also be related to the business of the enterprise. The language in which a document is written will be a member of a much smaller set than on the Internet. There may also be custom metadata, such as project name, department name, etc. which are usable to predict relevancy.

Another exemplary approach is to generate a ranking feature which is based on multiple document characteristics and generates a single value which is then used as an input to the neural network. One such ranking feature is known in the art as BM25. A more beneficial version of the BM25 formula is BM25F. This formula accounts for each occurrence of a term in the search query as it appears in each of several predetermined fields associated with the document being scored. Each field has its own weight and associated values (such as length) which are used to generate a field specific score for that occurrence. All field scores are combined for each term and these term scores are combined across all terms in the query to provide an overall score for each document. That overall score is then used as a relevance ranking feature by the neural network.

In one embodiment, a variation of BM25F, known as BM25G, is used. It generates the same results as BM25F but is adapted for use with neural networks. Specifically parameter b is transformed differently so that it is more convenient to take derivatives. This simplifies the task of training the neural network. The formula for BM25G is $$BM25G(Q, D) = \sum_{t \in Q} \frac{TF'_t}{k_1 + TF'_t} \cdot \log\left(\frac{N}{n_t}\right)$$

$$TF'_t = \sum_{p \in D} TF_{t,p} \cdot w_p \cdot \frac{1 + b_p}{\left(\frac{DL_p}{AVDL_p} + b_p\right)}$$

where Q is the query string; t is an individual query term (word); D is the document being scored; p is an individual property of the document; N is the total number of documents in the search domain; $n_t$ is the number of documents containing term t; $DL_p$ is the length of the property p; $AVDL_p$ is the average length of the property p; $TF_{t,p}$ is the term t frequency in the property p; $w_p$ is the weight for the property p; $b_p$ is the length normalization for the property p; and $k_1$ is the curvature.

In the BM25G formula, p, the individual property, refers to fields associated with the document in which the individual search terms may be found. In an exemplary embodiment, the specific fields used include body, title, author, anchor text, URL display name, and extracted title. It should be noted that some of the fields (i.e., body) are part of the document itself, while others may be metadata directly associated with the document and still others (i.e., anchor text specified for a hyperlink to the document) may be metadata which is indirectly associated with the document, but stored with a different document.

One embodiment of a search engine utilizing a neural network for relevance ranking uses one or more of the above ranking features to score documents by predicted relevance. Additional features could also be used. If desired, the set of features could be tailored to the specific environment in which the search engine is used.

Training

A neural network must be trained prior to operational use. One embodiment utilizes LambdaRank training which offers the advantage that new features can be added relatively easily to the ranking function without significantly affecting the training accuracy or training speed. As discussed above, one embodiment will also modify one or more of the values used in the transform functions as a part of the training process adding an additional degree of adaptability.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A computer-implemented method of determining a relevancy rank ordering score for a plurality of documents comprising:

(a) identifying, by at least one processing unit, a finite set of candidate documents;
(b) for each of the candidate documents:
   (i) obtaining raw data for a plurality of ranking features associated with the candidate document, the plurality of ranking features comprising at least two of: BM25, click distance, URL depth, file type, and language of the candidate document;
   (ii) transforming the raw data for the plurality of ranking features;
   (iii) normalizing the transformed raw data for the plurality of ranking features;
   (iv) using a neural network to calculate a relevancy score from the transformed, normalized raw data for the plurality of ranking features, wherein calculating the relevancy score further comprises:
      calculating hidden node scores at a plurality of hidden nodes from the transformed, normalized raw data, wherein the transformed, normalized raw data for each of the ranking features is provided to each of the plurality of hidden nodes; and
      calculating the relevancy score based on the hidden node scores;
(c) ranking the candidate documents according to the relevancy score for each of the candidate documents; and
(d) displaying a list of the ranked documents.

2. The method of claim 1 wherein at least one of the transformations is of the form $$\frac{1}{1+kx}$$

wherein x is the ranking feature and k is a saturation value.

3. The method of claim 2 wherein at least one of the saturation values is adjusted during training of the neural network.

4. The method of claim 1 wherein at least one of the transformations comprises mapping each value of an enumerated data type to a discrete binary value.

5. The method of claim 4 wherein the neural network accepts each discrete binary value as a separate input and applies a separate trainable weight to each of the separate inputs.

6. The method of claim 1 wherein the BM25 feature comprises the BM25G formula which uses at least one property selected from the group consisting of body, title, author, anchor text, URL, and extracted title.

7. A system for generating a relevancy ranking for documents comprising:
   at least one processing unit;
   a memory, communicatively coupled to the at least one processing unit, containing instructions that, when executed by the at least one processing unit, comprise:
   a module which identifies a set of candidate documents and makes available raw data for a plurality of ranking features for each of the candidate documents, the plurality of ranking features comprising at least two of: BM25, click distance, URL depth, file type, and language of the candidate document; and
   a ranking module comprising at least one input transformation, at least one input normalization, and a neural network, wherein the ranking module accepts the raw data for the plurality of ranking features for each of the candidate documents individually, applies the at least one input transformation to the raw data for each of the plurality of ranking features, applies the at least one input normalization to the transformed raw data for each of the plurality of ranking features, provides the transformed, normalized raw data for the plurality of ranking features to the neural network which calculates hidden node scores at a plurality of hidden nodes from the transformed, normalized raw data, wherein the transformed, normalized raw data for each of the ranking features is provided to each of the plurality of hidden nodes, and wherein the neural network calculates a relevancy score based on each of the hidden node scores for each of the candidate documents, and wherein the ranking module ranks the candidate documents and provides a list of the candidate documents for display.

8. The relevancy ranking system of claim 7 wherein the BM25 feature comprises the BM25G formula which uses at least one property selected from the group consisting of body, title, author, anchor text, URL, and extracted title.

9. The relevancy ranking system of claim 7 wherein the data module further comprises at least one transformation constant and the input transformation utilizes the transformation constant.

10. The relevancy ranking system of claim 7 wherein at least one of the input transformations is of the form $$\frac{1}{1+kx}$$

wherein x is the ranking feature and k is a configurable constant.

11. The relevancy ranking system of claim 10 wherein at least one of the configurable constants is adjusted during training of the neural network.

12. The relevancy ranking system of claim 7 wherein at least one of the input transformations comprises mapping each value of an enumerated data type to a discrete binary value and the neural network accepts each discrete binary value as a separate ranking feature and applies a separate ranking feature weight to each of the separate ranking features.

13. A computer implemented method of rank ordering a plurality of documents by relevancy comprising:
(a) identifying, by at least one processing unit, a finite set of candidate documents;
(b) for each of the candidate documents:
   (i) obtaining raw data for a plurality of ranking features associated with the candidate document, the plurality of ranking features comprising at least two of: BM25, click distance, URL depth, file type, and language of the candidate documents;
   (ii) applying a transformation to the raw data for the plurality of ranking features, wherein the transformation comprises a constant which is configurable;
   (iii) normalizing the transformed raw data for the plurality of ranking features;
   (iv) using a neural network to calculate a relevancy score from the transformed, normalized raw data for the plurality of ranking features, wherein calculating the relevancy score further comprises:
      calculating hidden node scores at a plurality of hidden nodes from the transformed, normalized raw data, wherein the transformed, normalized raw data for each of the ranking features is provided to each of the plurality of hidden nodes; and calculating the relevancy score based on each of the hidden node scores;
(c) ordering the candidate documents by the calculated relevancy scores; and
(d) displaying a list of the ordered candidate documents.

14. The rank ordering method of claim 13 wherein at least one of the transformation is of the form $$\frac{1}{1+kx}$$

wherein x is the ranking feature and k is one of the configurable constants.

15. The rank ordering method of claim 14 further comprising at least one ranking feature transformation comprising mapping each value of an enumerated data type to a discrete binary value and wherein the neural network accepts each discrete binary value as a separate ranking feature and applies a separate trainable weight to each of the discrete binary values.

16. The rank ordering method of claim 15 wherein the ranking features comprise at least BM25, click distance, URL depth, file type, and language and wherein click distance and URL depth are transformed using:

$$\frac{1}{1+kx}$$

wherein x is the ranking feature and k is one of the configurable constants, and wherein file type, and language are transformed by mapping each value of an enumerated data type to a discrete binary value and wherein the neural network accepts each discrete binary value as a separate ranking feature and applies a separate trainable weight to each of the discrete binary values.

17. The method of claim 16 wherein the BM25 feature comprises the BM25G formula which uses the properties of body, title, author, anchor text, URL, and extracted title.

* * * * *